(12) United States Patent
Williams

(10) Patent No.: US 10,513,241 B2
(45) Date of Patent: Dec. 24, 2019

(54) COMPACT FORCE LIMITER FOR AUTOMOTIVE SAFETY RESTRAINTS

(71) Applicant: TOYOTA MOTOR ENGINEERING & MANUFACTURING NORTH AMERICA, INC., Erlanger, KY (US)

(72) Inventor: Colby S. Williams, Milan, MI (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 70 days.

(21) Appl. No.: 15/851,347

(22) Filed: Dec. 21, 2017

(65) Prior Publication Data
US 2019/0193673 A1     Jun. 27, 2019

(51) Int. Cl.
*B60R 22/28* (2006.01)
*B60R 22/30* (2006.01)
*B60R 22/18* (2006.01)

(52) U.S. Cl.
CPC .............. *B60R 22/28* (2013.01); *B60R 22/18* (2013.01); *B60R 22/30* (2013.01); *B60R 2022/1818* (2013.01); *B60R 2022/286* (2013.01)

(58) Field of Classification Search
CPC ..... B60R 22/28; B60R 22/30; B60R 22/3413; B60R 2022/286
See application file for complete search history.

(56) References Cited

U.S. PATENT DOCUMENTS

| | | | |
|---|---|---|---|
| 4,027,905 A | 6/1977 | Shimogawa et al. | |
| 6,312,057 B1 * | 11/2001 | Feile | B60R 22/28 |
| | | | 280/805 |
| 7,168,742 B2 | 1/2007 | Tomita | |
| 7,232,155 B2 | 6/2007 | Nishizawa | |
| 7,571,934 B2 | 8/2009 | Bell et al. | |
| 7,607,697 B2 | 10/2009 | Esler et al. | |
| 7,703,806 B2 | 4/2010 | Bell et al. | |
| 9,090,225 B2 | 7/2015 | Rouhana | |
| 2017/0225649 A1 | 8/2017 | Jaradi et al. | |

\* cited by examiner

*Primary Examiner* — Faye M Fleming
(74) *Attorney, Agent, or Firm* — Oblon, McClelland, Maier & Neustadt, L.L.P.

(57) ABSTRACT

The present disclosure relates to an apparatus for vehicle occupant safety during automotive collisions. The apparatus includes a plurality of compression elements rigidly fixed to a first seat belt guide and a second seat belt guide. The compression elements are arranged to resist compressive loading in response to an impact force, such as that experienced during rapid deceleration of a vehicle occupant in an automotive collision. When a pre-determined threshold force has been overcome, the compression elements predictably deform, thus absorbing energy associated with the deceleration. As a result of deformation of the compression elements, additional seat belt length is pulled from the apparatus, thus shielding the vehicle occupant from maximal injury.

15 Claims, 6 Drawing Sheets

COMPACT FORCE LIMITER FOR AUTOMOTIVE SAFETY RESTRAINTS

BACKGROUND

Automotive vehicles employ a variety of mechanisms to provide for the safety of vehicle occupants. In particular, seat belt technologies provide restraint to vehicle occupants during periods of rapid deceleration, such as those during automotive collisions. U.S. Pat. No. 9,090,225 B2 entitled "Shoulder Belt Latch Load-Limiting System" by Rouhana is directed to a three point seat belt system wherein a locking cam and deformable member are configured to limit stresses applied to the vehicle occupant during a period of rapid deceleration.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus for limiting force incorporated into a seat belt restraint of an automotive vehicle. The apparatus includes compression elements fixed to a first seat belt guide and a second seat belt guide, with seat belt channels therein to permit functional incorporation in a seat belt system.

The compression elements of the apparatus are arranged to normalize the application of load relative to an orientation of the apparatus. Further, the compression elements of the apparatus deform upon sufficient loading. During an automotive vehicle collision, deformation of the compression elements of the apparatus decreases the length of the apparatus, thus increasing the effective length of a seat belt by two times the compressed distance of the apparatus.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
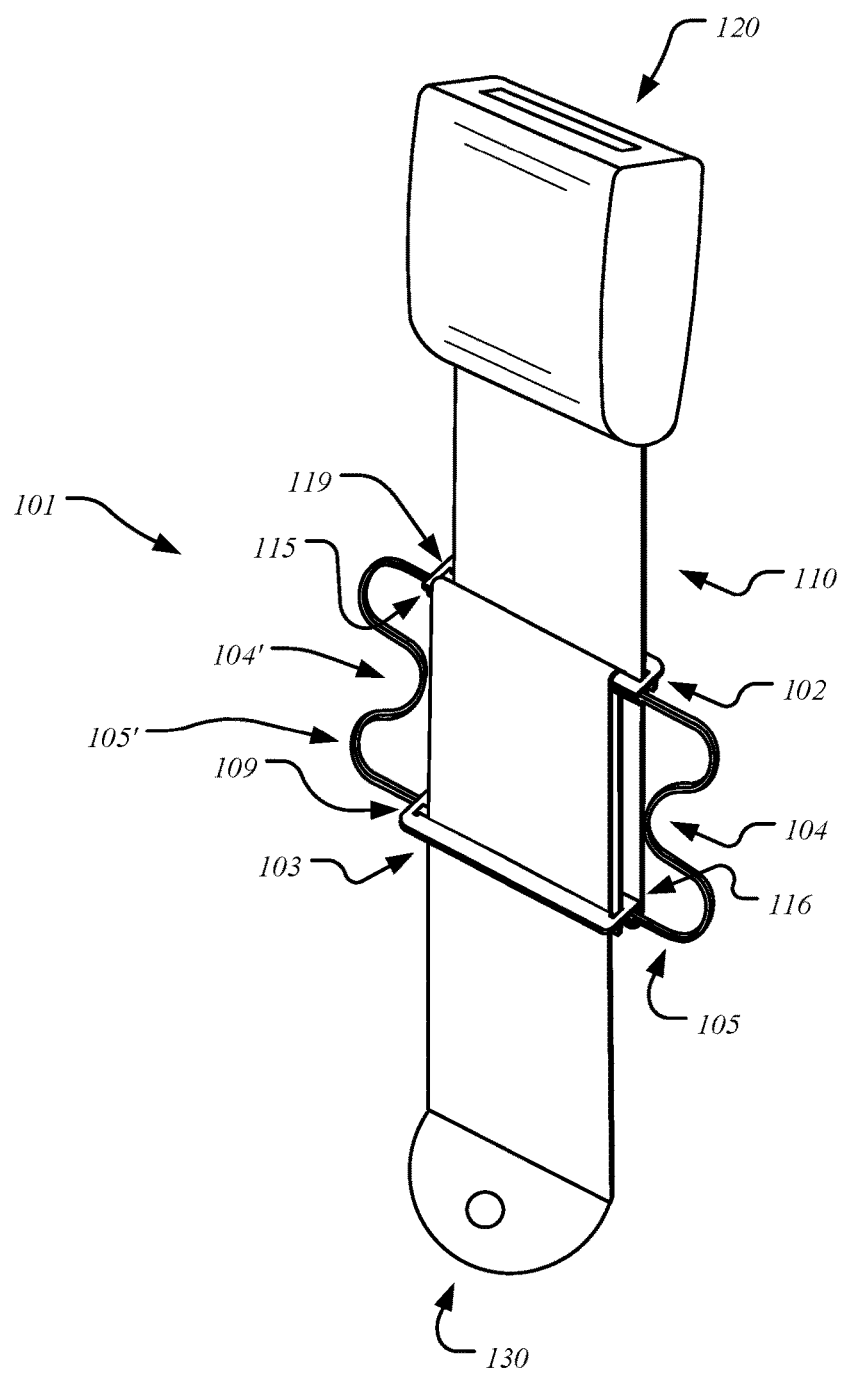
FIG. 1 is a perspective view of an exemplary embodiment of an apparatus for limiting force in a seat belt system.

FIG. 1 is a perspective view of the apparatus for limiting force deployed in a seat belt system. In an exemplary embodiment, a seat belt anchor 130 at a first end of a seat belt 110 is fixed rigidly to the frame of the seat. A buckle 120 is disposed at a second end of the seat belt 110. The seat belt 110 is woven through the seat belt guides 102, 103 from a forward aspect 115 to a rear aspect 116. Specifically, from the first end of the seat belt, the seat belt 110 is woven through a seat belt channel of a first seat belt guide 109 of the apparatus 101. The seat belt 110 is then woven around a forward aspect 115 of a second seat belt guide 102 and passed through a seat belt channel of the second seat belt guide 119. The seat belt 110 is again woven through the seat belt channel of the first seat belt guide 109 and around a rear aspect 116 of the first seat belt guide 103. The seat belt 110 is returned through the seat belt channel of the second seat belt guide 119 and, following a pre-determined length of seat belt 110, terminates in the buckle 120. The seat belt guides 102, 103 further include compression element attachment points on opposing surfaces of a long dimension of the seat belt guides 102, 103. In this embodiment, and in a non-limiting manner, the compression elements 105, 105' are described as rectangular compression bars. Further, the compression elements 105, 105' are coupled at opposing corners of the first seat belt guide 103 and the second seat belt guide 102. The compression elements 105, 105' are include at least one stress riser 104, 104' to facilitate controlled, pre-determined deformation of the compression elements 105, 105', and thus the apparatus 101, under increased levels of load. Deformation of the compression elements may proceed via plastic deformation, elastic deformation, or a combination thereof.

In an exemplary embodiment of the present disclosure, following rapid deceleration of a constrained object (e.g. vehicle occupant during automotive collision), a force is applied to the second end of the seat belt, thus applying tension along the length of the seat belt 110. Tension along the length of the seat belt 110, combined with the woven organization of the seat belt 110 through the apparatus 101, creates a compressive force in the compression elements 105, 105'. When the compressive force in the elements reaches a pre-determined level, and pursuant to the material properties of the compression elements 105, 105', deformation is initiated at pre-determined stress risers 104, 104' along the length of the compression elements 105, 105'. According to the woven organization of the seat belt 110 and the magnitude of deformation experienced by the compression elements 105, 105' in response to deceleration, total length of the apparatus 101 will be reduced, thus increasing total effective seat belt 110 length. As the compression elements 105, 105' absorb energy and the total effective length of the seat belt 110 is increased, the length of time the occupant experiences force is increased accordingly, thereby decreasing the maximum force experienced by the occupant and reducing occupant injury.

Figure 2:
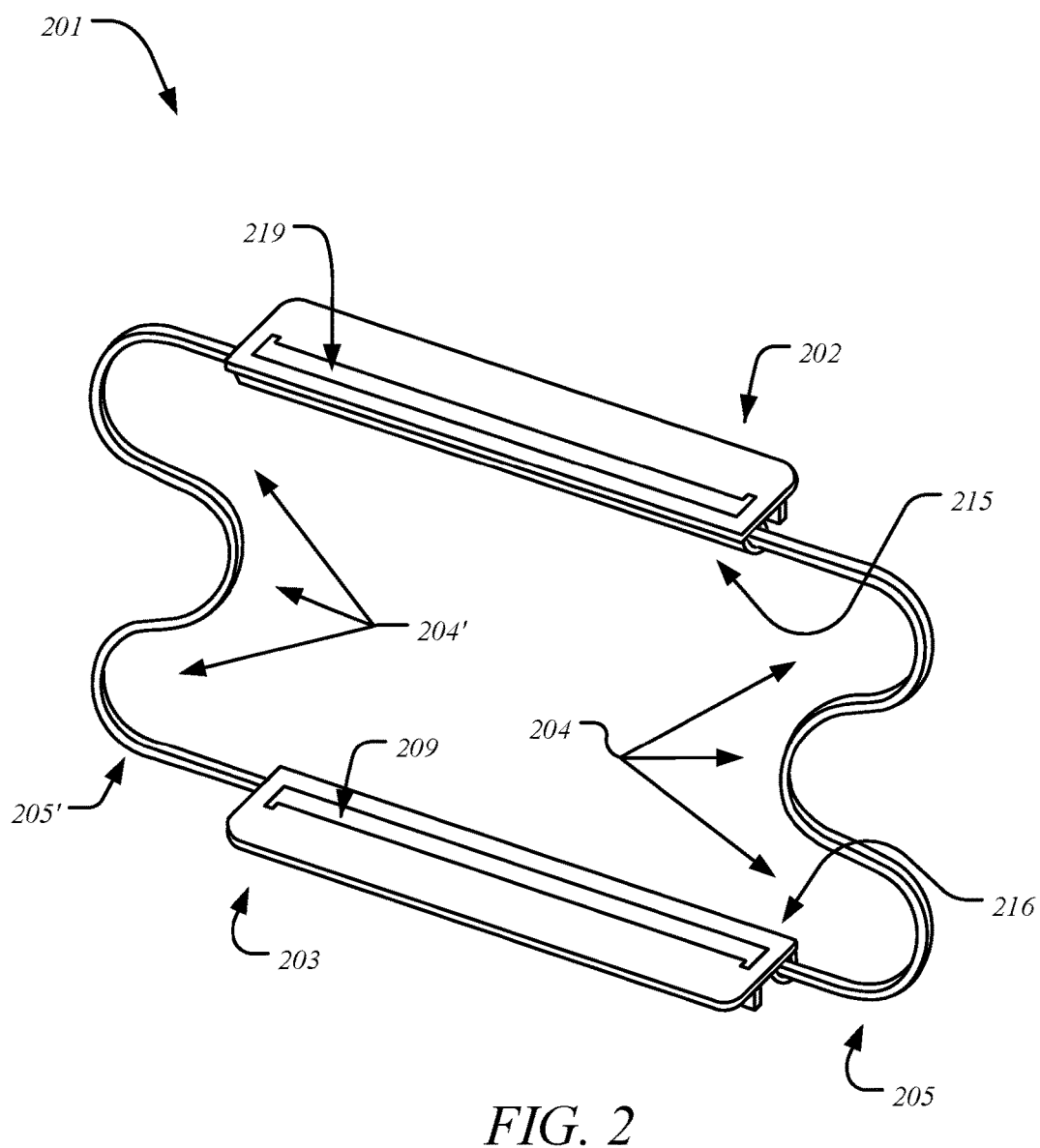
FIG. 2 is a perspective view of the exemplary embodiment of an apparatus for limiting force.

FIG. 2 is a perspective view of the apparatus for limiting force. A first seat belt guide 203 is oriented with compression elements 205, 205' at a rear aspect 216 of the first seat belt guide 203. A second seat belt guide 202 is oriented with compression elements 205, 205' at a forward aspect 215 of the second seat belt guide 202. The orientation of the seat belt guides 202, 203 ensures (1) force application in a desired plane relative to the compression elements and (2) appropriate weaving of the seat belt through the seat belt channels 209, 219 disposed in the seat belt guides 202, 203. Force application along a desired plane of the apparatus 201 relative to the compression elements ensures controlled compression of the elements at the stress risers 204, 204'.

Figures 3A, 3B:
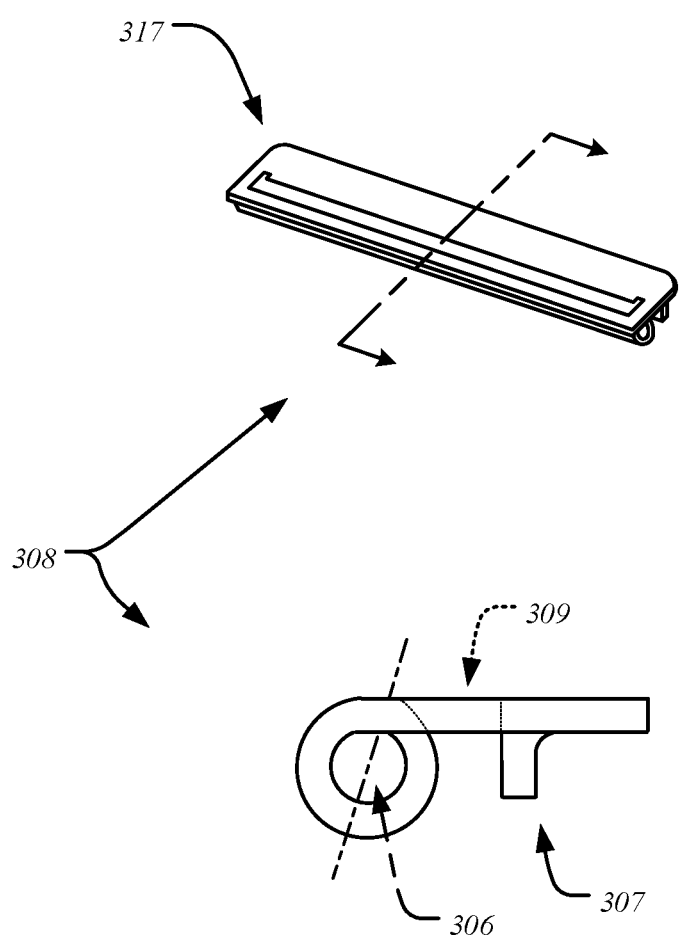
FIG. 3A and FIG. 3B are a perspective view and cross-sectional view, respectively, of a seat belt guide of the apparatus for limiting force.

FIG. 3A and FIG. 3B are a perspective view and cross-sectional view, respectively, of a seat belt guide. The dashed lines of FIG. 3A indicate a cross-sectional view 308 of the seat belt guide 317. In FIG. 3B, the cross-sectional view 308 of the seat belt guide 317 illustrates the structural components of the apparatus. The compression elements are rigidly coupled to the seat belt guide 317 at compression element channels 306. The seat belt is woven through the seat belt channel 309 and is constrained by a seat belt stabilization post 307 that ensures the seat belt remains in plane upon force application. In an exemplary embodiment, the seat belt channel 309, 319 is allows the seat belt to pass through the seat belt channel 309, 319 during two loops. The number of loops of the seat belt through the seat belt channel 309, 319 in the present disclosure should not be considered limiting and is merely representative of a plurality of loops appropriate to lengthen the seat belt in context of the applied force. In an exemplary embodiment, two loops ensure a compact design and proper force application onto the compression elements of the apparatus.

Figure 4:
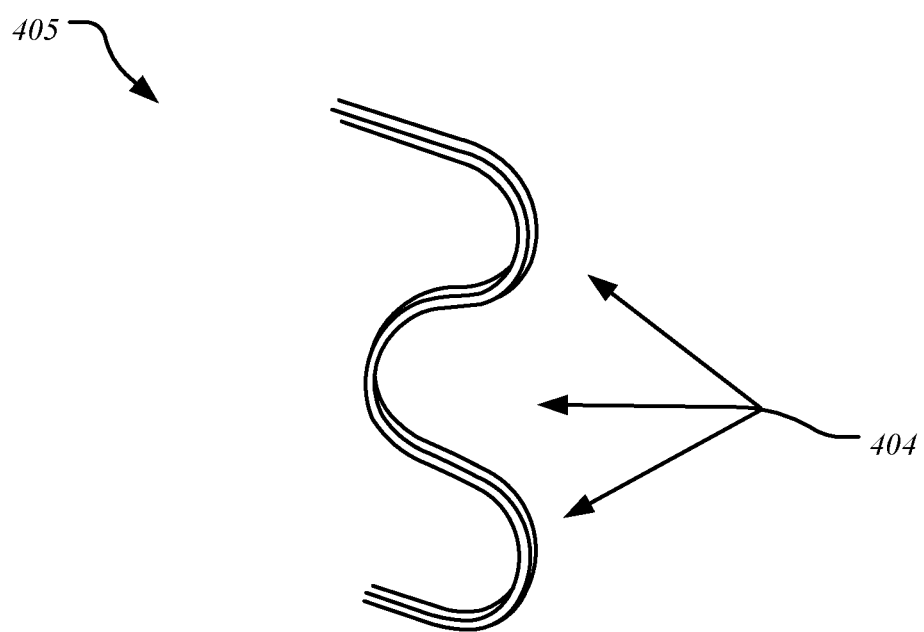
FIG. 4 is a perspective view of a compression element of the apparatus for limiting force.
Figures 5A, 5B, 5C:
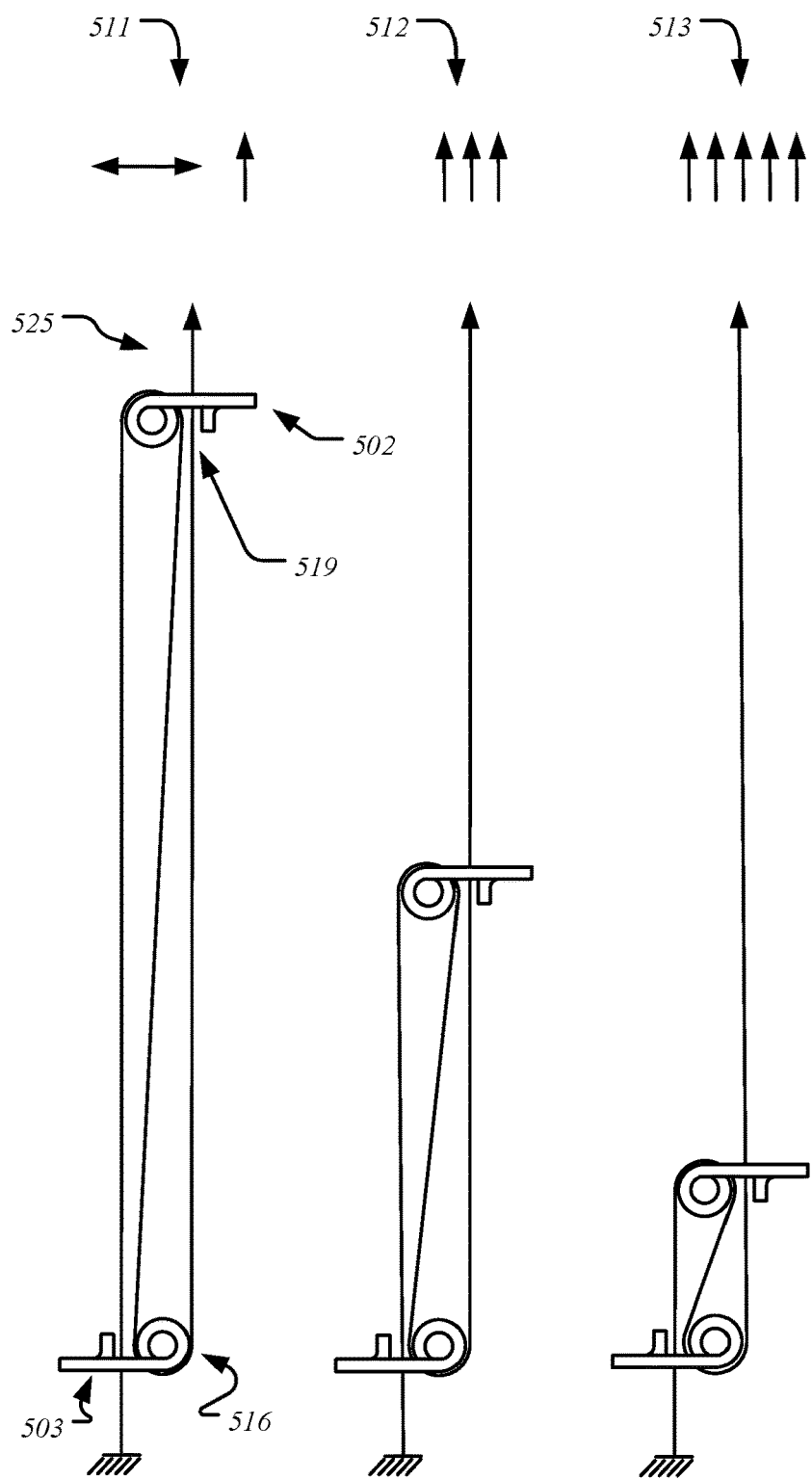
FIGS. 5A-C are illustrations related to various compression levels of the compression elements of the apparatus for limiting force.

FIG. 4 is a perspective view of the compression elements of the apparatus. The compression elements 405 include at least one stress riser 404. Stress risers are included to guide compression of the compression elements during force application. The inclusion of at least one stress riser in the compression elements guarantees that under subsequent force application, strain hardening, or similar irregularity in the deformation rate of the material, will be avoided and a predictable force vs. compression response will be observed. The number and location of stress risers may be tailored according to the needs of a specific application. In an exemplary embodiment, the compression elements 405 are rectangular compression bars fabricated from ductile metal and include three stress risers 404. Three stress risers 404 are included to ensure that deformation of the compression elements 405 occurs at a rate proportional to the rate of change in the force applied to the compression elements. The shape and material chosen for the compressive elements in the present disclosure should not be considered limiting and are merely representative of a variety of shapes and materials with material properties and structural properties suitable to serve as compressive elements, as would be obvious to one of ordinary skill in the art.

FIGS. 5A-D are illustrations related to various compression levels of the compression elements of the apparatus for limiting force. These illustrations relate to the apparatus for limiting force as it is engaged with a seat belt woven through the seat belt guides 502, 503. In an exemplary embodiment, varying levels of force are applied to the second end of the seat belt system 525. As force is applied, the seat belt, woven through the seat belt channel of the second seat belt guide 519 and wrapped around the rear aspect of the first seat belt guide 516, begins to pull the first seat belt guide 503 in the direction of the second seat belt guide 502, thus applying a compressive force to the apparatus. The compressive elements (not shown) rigidly attached to each seat belt guide 502, 503 resist this compressive force, controlling the length of seat belt extended from the apparatus and, therefore, determining the force limiting capacity of the apparatus. FIG. A is an illustration of the apparatus under normal loading conditions (e.g. no occupant or an occupant engaged in normal accelerations/decelerations). The horizontal and vertical arrows 511 indicate neutral or moderately increased force applied to the apparatus. As the force applied to the apparatus during normal occupant activity is insufficient to deform the compressive elements of the apparatus, there is no effective change in seat belt length as the apparatus is uncompressed. Under high loading, indicated by three vertical arrows 512 and as may be experienced during a minor automotive collision, the force applied to the apparatus is elevated beyond a level pre-determined to initiate deformation of the compression elements. Shown in FIG. 5B, force applied to the first seat belt guide, and subsequently the second seat belt guide, produces deformation in the compression elements. Deformation of the compression elements reduces the length of the apparatus, allowing additional seat belt length to be pulled from the apparatus and added to the seat belt system. The force absorbed by the apparatus, resulting in deformation of the compression elements, thereby shields the vehicle occupant from maximal injury. In the case of a major automotive collision FIG. 5C, when applied loads are severe as the result of rapid deceleration (indicated by the five vertical arrows 513), the force applied to the apparatus is well beyond the force required for deformation of the compression elements. Aided by the stress risers in the compression elements that ensure predictable deformation across a range of applied loads, the apparatus is further compressed to allow additional seat belt to be pulled from the apparatus. Under these severe loading conditions, a maximal force is absorbed by the apparatus as the seat belt is pulled through the seat belt guides and, therefore, shields a portion of the deceleration force from the vehicle occupant.

Figure 6A:
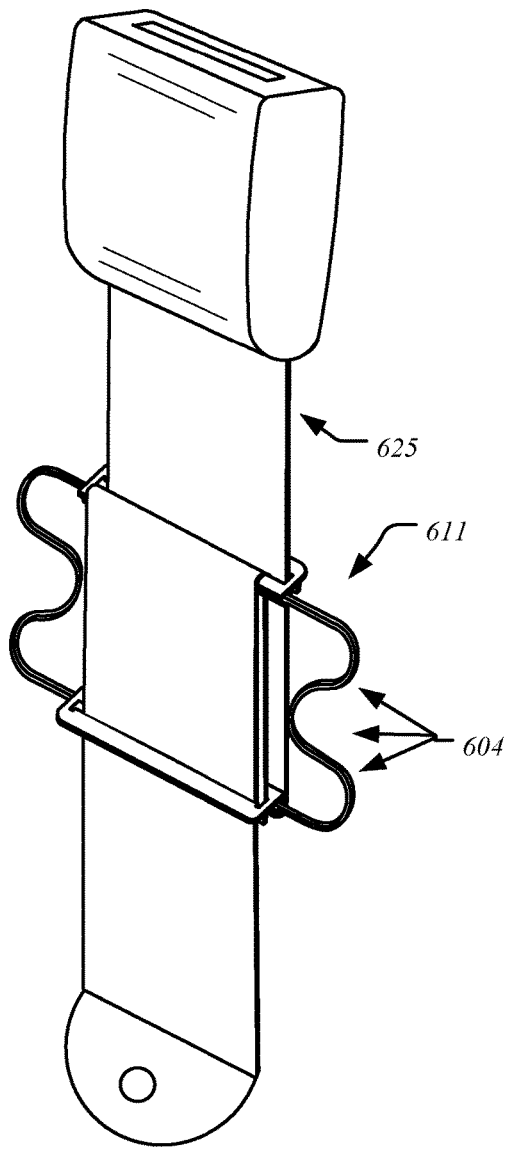
FIG. 6A and FIG. 6B are perspective views of an exemplary embodiment of the apparatus for limiting force in an uncompressed and compressed state, respectively.
Figure 6B:
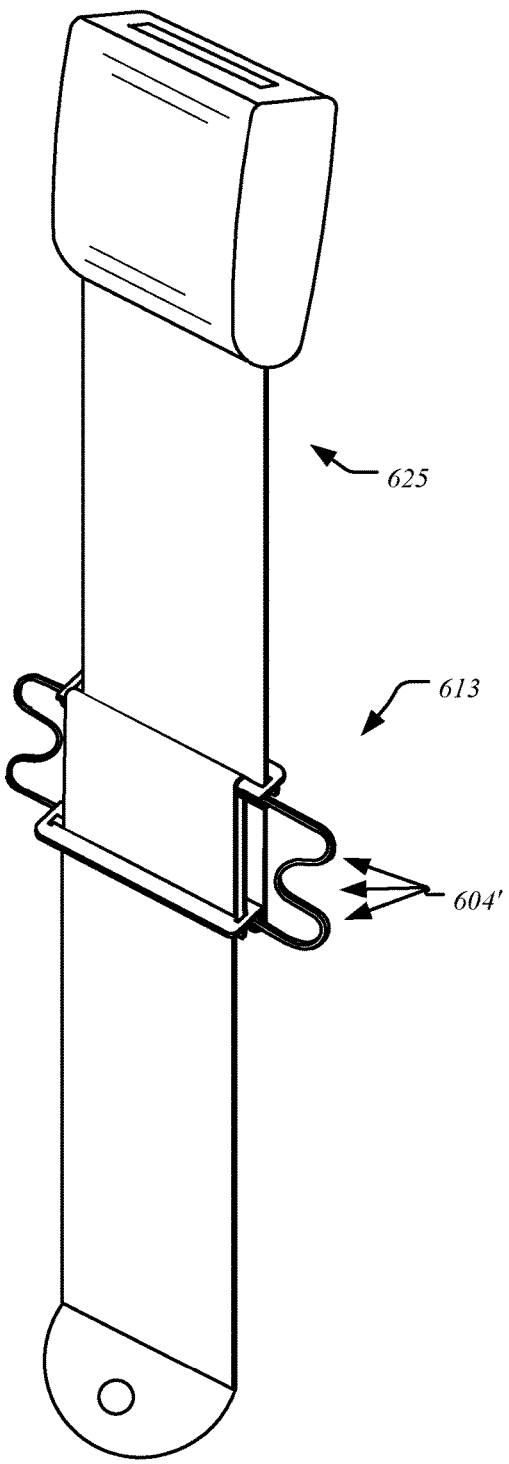

FIG. 6A and FIG. 6B are perspective views of an exemplary embodiment of the apparatus for limiting force in an uncompressed and compressed state, respectively. In an uncompressed state FIG. 6A, the compression elements are under normal loading. The stress risers 604 have not been deformed as the result of a force applied from the second end of the seat belt 625. In FIG. 6B, however, a high load has been applied 613 to the seat belt system as the vehicle occupant experiences rapid deceleration during an automotive collision. As a result, the compression elements 604' of the apparatus deform as the load applied from the second end of the belt 625 surpasses the pre-determined material properties of the compression elements 604'. Deformation of the compression elements 604', and thus compression of the apparatus, allows additional woven seat belt length to be pulled from the apparatus, protecting the vehicle occupant from absorbing the totality of the deceleration force (i.e., as force is absorbed in the compression elements 604' of the apparatus and deformation occurs, the resulting maximum force of deceleration experienced by the vehicle occupant is reduced).

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for limiting force in a seat belt safety system, the apparatus comprising:
    a first seat belt guide at a first end and a second seat belt guide at a second end, a distance therebetween defining a long dimension of the apparatus; and
    a plurality of compression elements extending from the first seat belt guide to the second seat belt guide, wherein
    the plurality of compression elements deform, in response to a tensile force applied to a seat belt engaged with the first seat belt guide and the second seat belt guide, when the applied tensile force exceeds a threshold defined by material properties and structural properties of the plurality of compression elements, the deformation of the plurality of compression elements reducing the long dimension of the apparatus.

2. The apparatus of claim 1, wherein the plurality of compression elements include at least one stress riser predisposed on the plurality of compression elements, the at least one predisposed stress riser initiating deformation of the plurality of compression elements in a pre-determined manner.

3. The apparatus of claim 1, wherein, when the applied tensile force exceeds the threshold defined by the material properties and the structural properties of the plurality of compression elements, the plurality of compression elements deform in a pre-determined manner.

4. The apparatus of claim 1, wherein the plurality of compression elements deform at a pre-determined rate proportional to a rate of change of the applied tensile force.

5. The apparatus of claim 1, wherein the plurality of compression elements undergo plastic deformation, elastic deformation, or a combination thereof.

6. The apparatus of claim 1, wherein the plurality of compression elements are arranged for loading in a direction parallel to a longitudinal axis of the apparatus, the longitudinal axis extending through the first end of the apparatus and the second end of the apparatus.

7. The apparatus of claim 1, wherein the plurality of compression elements are composed of one or more struts arranged parallel to the longitudinal axis of the apparatus.

8. The apparatus of claim 1, wherein the plurality of compression elements have a substantially circular or polygonal cross-section.

9. The apparatus of claim 1, wherein the plurality of compression elements are fabricated of at least one of titanium, stainless steel, ceramic, plastic, or a combination thereof.

10. The apparatus of claim 1, wherein the first seat belt guide and the second seat belt guide include
    a seat belt channel, and
    a compression element attachment point.

11. The apparatus of claim 10, wherein the first seat belt guide and the second seat belt guide further include
    a seat belt stabilization post disposed adjacent and perpendicular to the seat belt channel.

12. The apparatus of claim 10, wherein the seat belt channel is of a rectangular shape and dimensioned to accommodate a plurality of layers of the seat belt.

13. The apparatus of claim 1, wherein the first seat belt guide and the second seat belt guide are of a variety of materials including at least one of titanium, stainless steel, ceramic, plastic, or a combination thereof.

14. A method of an apparatus for limiting force in a seat belt safety system, the method comprising:
    applying a tensile force to a first end of a seat belt engaged with a first seat belt guide and a second seat belt guide, wherein
    a plurality of compression elements extending between the first seat belt guide and the second seat belt guide deform in response to the applied tensile force, the deformation occurring in a pre-determined manner to reduce a distance between the first seat belt guide and the second seat belt guide.

15. A method of an apparatus for limiting force in a seat belt safety system, the method comprising:
    applying a tensile force to a seat belt anchored at a first end, wherein the tensile force applied to the seat belt reduces a distance between a first seat belt guide and a second seat belt guide, wherein
    a plurality of compression elements extending between the first seat belt guide and the second seat belt guide deform in response to the applied tensile force, the deformation of the plurality of compression elements occurring in a pre-determined manner according to a magnitude of the applied tensile force, and
    deformation of the plurality of compression elements reducing a magnitude of the applied tensile force.

* * * * *